US007648063B2

(12) United States Patent
Priya et al.

(10) Patent No.: US 7,648,063 B2
(45) Date of Patent: Jan. 19, 2010

(54) METHOD OF BATCH EMBOSSING AND PRODUCT THEREOF

(75) Inventors: Suresh C. Priya, Aurora, IL (US); Anthony R. Dass, Forest Park, IL (US)

(73) Assignee: Unique Embossing Services, Inc., Westmont, IL (US)

( * ) Notice: Subject to any disclaimer, the term of this patent is extended or adjusted under 35 U.S.C. 154(b) by 374 days.

(21) Appl. No.: 11/440,426

(22) Filed: May 24, 2006

(65) Prior Publication Data

US 2007/0272097 A1 Nov. 29, 2007

(51) Int. Cl.
*G06K 5/00* (2006.01)

(52) U.S. Cl. ........................ 235/380; 235/487; 235/492; 235/474

(58) Field of Classification Search ................. 235/380, 235/487, 492–474
See application file for complete search history.

(56) References Cited

U.S. PATENT DOCUMENTS 7,029,547 B2 4/2006 Biller
7,384,003 B1 * 6/2008 Boyer et al. ................ 235/494
2006/0175018 A1 * 8/2006 Biller ........................ 156/553
2007/0095920 A1 * 5/2007 Eke et al. .................... 235/487

* cited by examiner

*Primary Examiner*—Allyson N Trail
(74) *Attorney, Agent, or Firm*—McDermott Will & Emery LLP

(57) ABSTRACT

An embossed sheet of substrate material has a plurality of card portions defined thereon, each card portion having indicia embossed thereon. A first group of the plurality of card portions has first embossed indicia, and a second group of the plurality of card portions has second embossed indicia. The first and second embossed indicia provide the same information, but the second embossed indicia have a text characteristic that is different from the text characteristic of the first embossed indicia. The first embossed indicia and the second embossed indicia are embossed in the same location on each respective card portion. The card portions are arranged into rows and columns on the substrate material, and the first group of card portions and the second group of card portions form either alternating rows or alternating columns.

17 Claims, 5 Drawing Sheets

METHOD OF BATCH EMBOSSING AND PRODUCT THEREOF

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates generally to embossing characters on a substrate, and more specifically to batch embossing of similar information on a plurality of like members on a common carrier.

BACKGROUND OF THE INVENTION

Methods of embossing various types of substrates are well known in the art. One substrate that is embossed is the substrate for a card, such as credit or general purpose debit cards issued by or associated with a banking or other similar financial institution, as well as non-secure cards such as those for identification, sponsorship, membership, loyalty or promotional purposes, which may or may not be associated with the delivery of prepaid services, and/or to facilitate delivery of prepaid services. Typically, the information embossed on each card was different. Recently, however, a need has arisen to place similar text on numerous cards. U.S. Pat. No. 7,029,547 discloses one method whereby multiple individual cards are manufactured from a single sheet of material. Each card has the same information embossed thereon, but the information on cards of adjacent columns of the sheet is offset relative to one another. While such embossing methods according to the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides an embossed sheet of substrate material having a plurality of card portions defined thereon, each card portion having indicia embossed thereon. A first group of the plurality of card portions has first embossed indicia, and a second group of the plurality of card portions has second embossed indicia. The first and second embossed indicia provide the same information, but the second embossed indicia have different data (i.e., a text characteristic that is different from the text characteristic of the first embossed indicia).

According to one embodiment, the text characteristic is text font and the second embossed indicia have a different text font than the first embossed indicia.

According to another embodiment, the text characteristic is text size and the second embossed indicia have a different text size than the first embossed indicia.

According to another embodiment, the first embossed indicia and the second embossed indicia are embossed in the same location on each respective card portion.

According to another embodiment, the card portions are arranged into rows and columns on the substrate material, and the first group of card portions and the second group of card portions form either alternating rows or alternating columns.

According to another embodiment, the card portions have printed indicia printed thereon and additional embossed indicia embossed thereon. The additional embossed indicia have the same text characteristic as the embossed indicia of one of the first embossed indicia and the second embossed indicia.

The present invention also provides a method of making non-nesting embossed card products having the same information thereon. A first card is embossed with first embossed indicia, and a second card is embossed with second embossed indicia. The second embossed indicia provide the same information as the first embossed indicia, but with different data (i.e., the second embossed indicia have a text characteristic that is different from the text characteristic of the first embossed indicia).

According to one embodiment, the first embossed indicia are embossed in the same location on the first card as the location of the second embossed indicia on the second card.

According to another embodiment, the method further includes the step of embossing the first card and the second card to add additional indicia thereto. The additional indicia have the same text characteristic as the embossed indicia of one of the first card and the second card.

According to another embodiment, the method further includes the step of providing a single sheet of material having a plurality of first and second cards thereon.

The present invention also provides a method of making embossed card products whereby indicia are embossed on a sheet of material to define a plurality of first card portions and a plurality of second card portions. Each card portion has substantially identical information thereon, but at least some of the data is different. A portion of the embossed indicia on the first card portions have a text characteristic different from a portion of the embossed indicia on the second card portions. The card portions are punched from the sheet to form a plurality of cards, and the cards are provided in an arrangement alternating between cards formed from the first card portions and cards formed from the second card portions.

According to one embodiment, the method further includes the step of embossing the first and second card portions to add additional indicia thereto. The additional indicia have the text characteristic the same as the embossed indicia of one of the embossed indicia of the first card portions and the embossed indicia of the second card portions.

According to another embodiment, the first and second card portions are arranged into rows and columns on the sheet, and the first card portions and the second card portions form one of alternating rows and columns.

According to another embodiment, the embossed indicia are embossed in the same location on the first card portions as the location of the embossed indicia on the second card portions.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
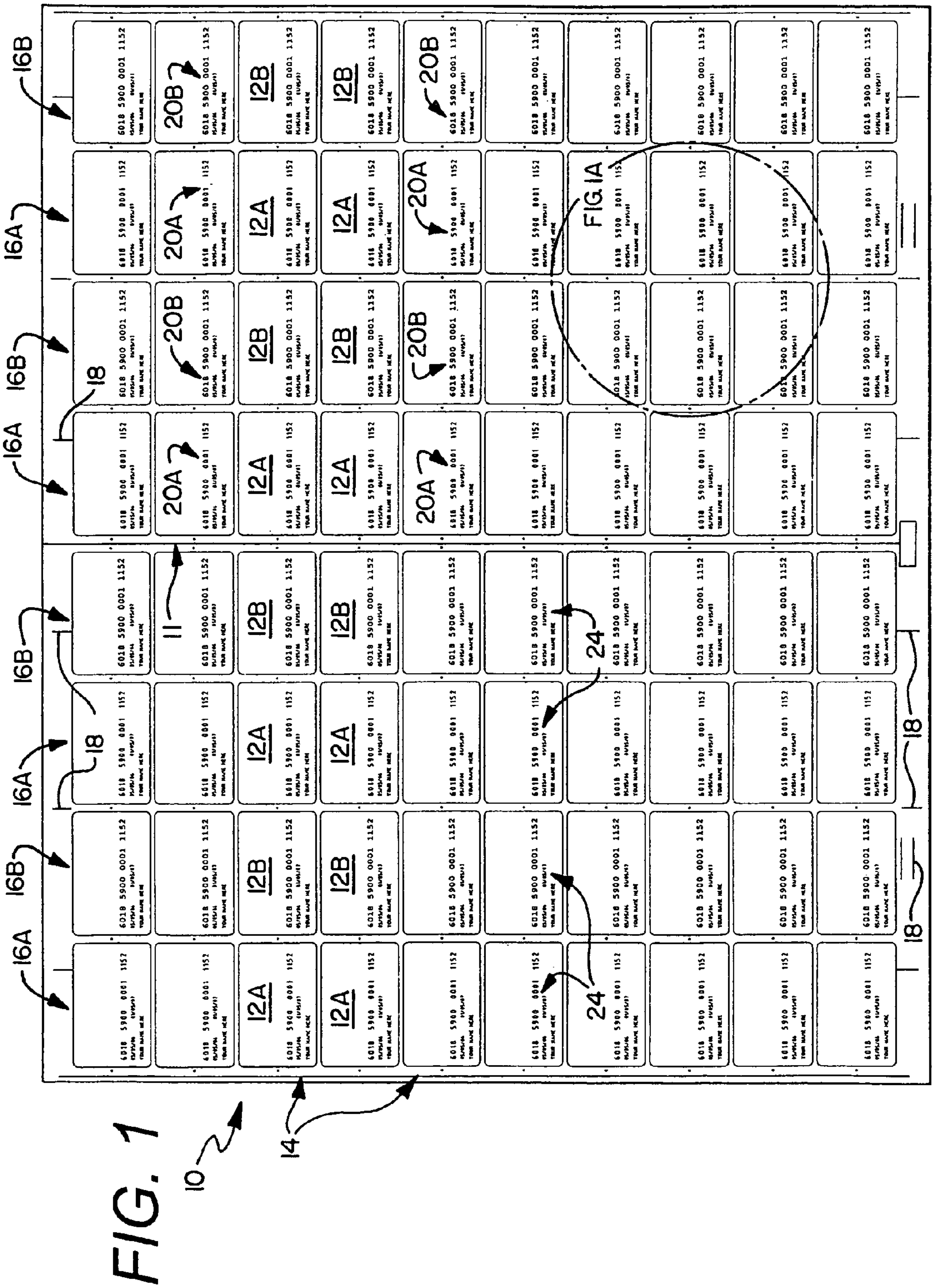
FIG. 1 is a plan view of one embodiment of an embossed sheet product of the present invention, having a magnified portion to show detail.
Figure 1A:
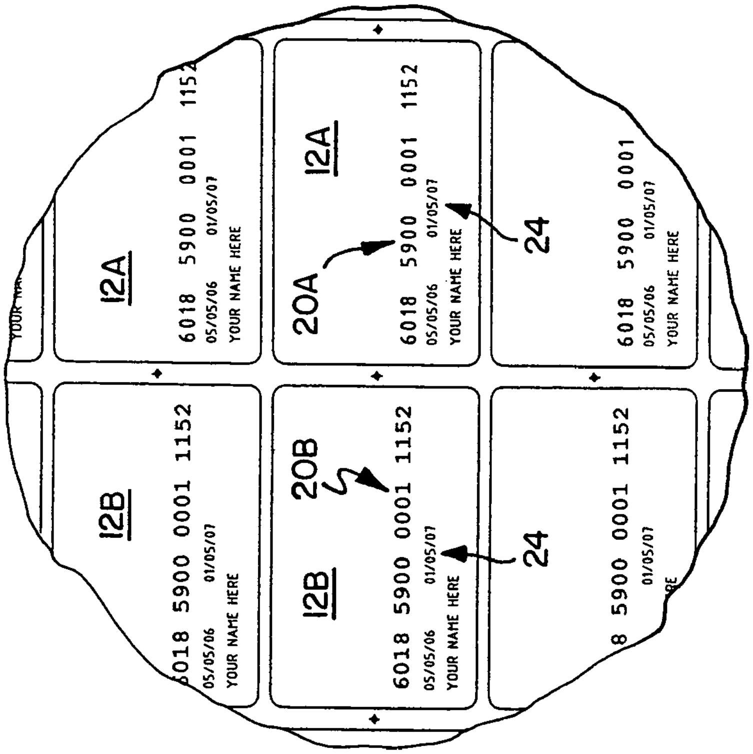

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2A:
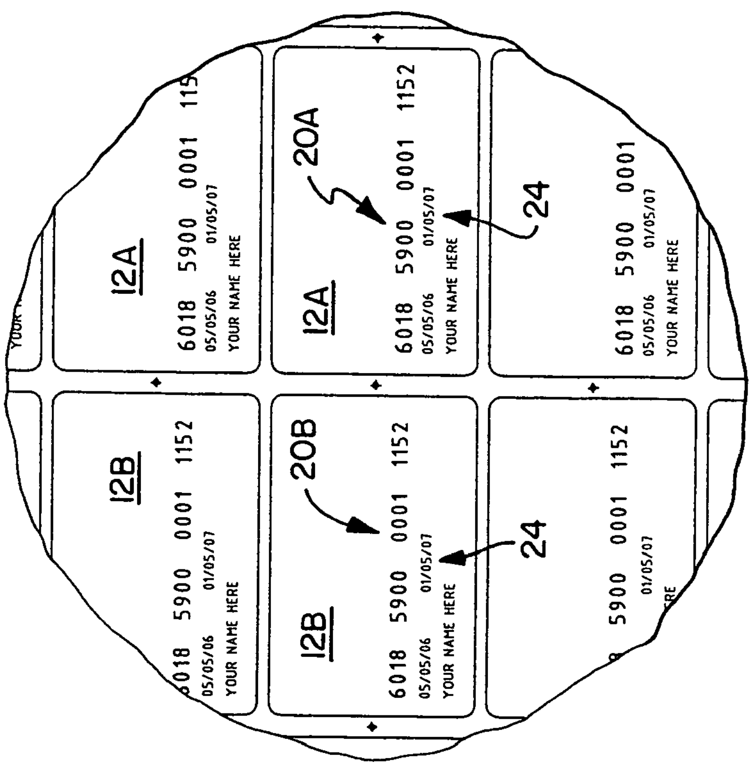
FIG. 2 is a plan view of another embodiment of an embossed sheet product of the present invention, having a magnified portion to show detail.
Figure 2:
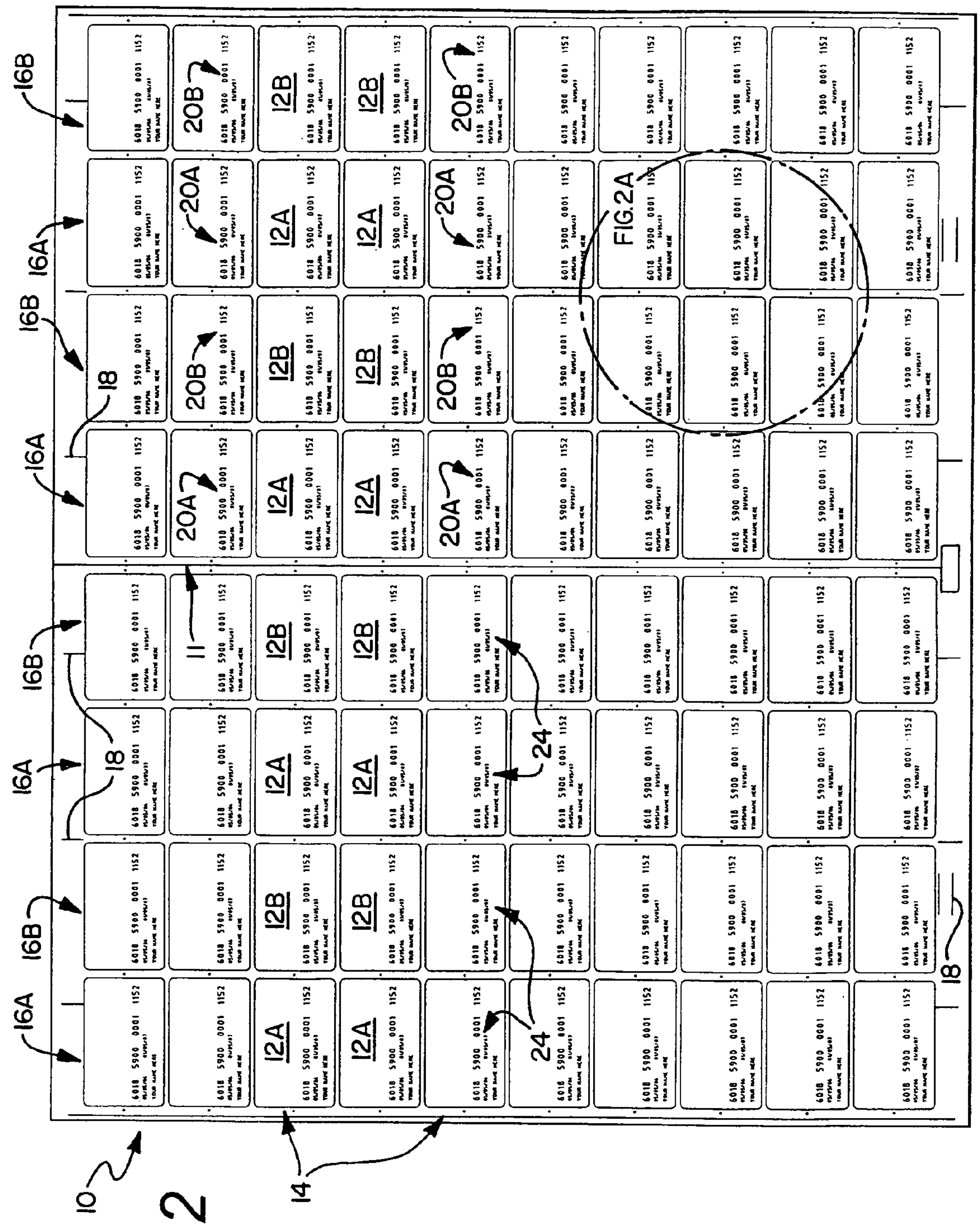

Referring now to the Figures, and specifically to FIGS. 1 and 2, there are shown two embodiments of an embossed sheet product 10 having a plurality of cards or card portions 12 arranged in rows 14 and columns 16. The sheet product 10 is preferably made of a plastic substrate material, such as PVC, however, other materials may be utilized. In the embodiment shown, the sheet 10 has eighty (80) card portions, arranged in ten rows 14 and eight columns 16. The sheet 10 also has a plurality of registration marks 18, which are machine-detectable and used for registering the sheet 10 during processing, as described below. Additionally, in the embodiments shown, the card portions 12 are separated by a skeleton 11 of the substrate that remains when the card portions 12 are removed from the sheet product 10.

Figure 3:
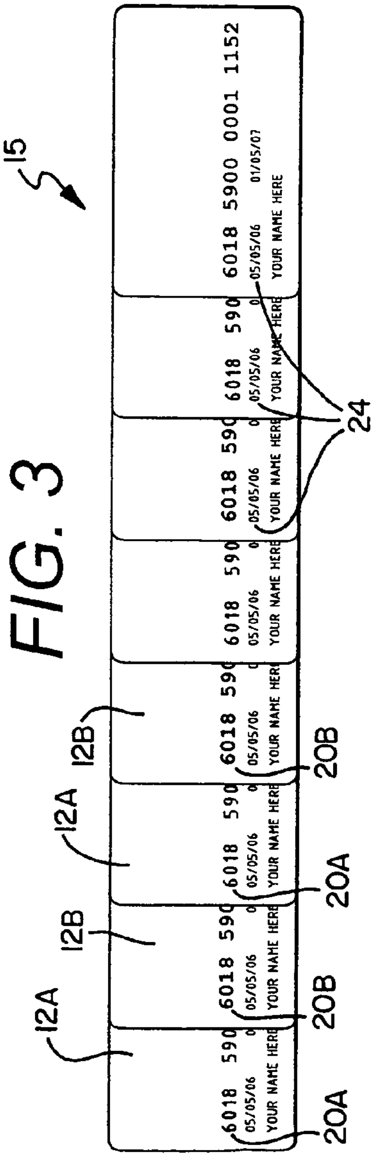
FIG. 3 is a plan view of a plurality of card products from the sheet product of FIG. 1 being stacked.

Each card portion 12 is adapted to be removed from the sheet 10 to form a card 12, as illustrated in FIG. 3 and described below. Referring to FIGS. 1 and 2, in one embodiment each card portion 12 has various embossed information, such as an account number, a name (such as "YOUR NAME HERE") and various dates that are provided with various data. The embossed information is provided as embossed indicia 20 on the card portions 12, where each embossed indicia 20 contains data that provides certain information as described above. In a preferred embodiment, the embossed indicia 20 that provides the same information on each card portion 12 is located in the same location, both vertically and laterally, on all similar card portions 12. The type and arrangement of the embossed indicia 20 may be altered to fit different card types.

The embossed information shown in the embodiments of FIGS. 1 and 2 is typically the same on all card portions 12, however, some of the data utilized to convey the information may be different to preclude nesting of adjacent cards during stacking of the cards. For example, in FIG. 1 certain of the embossed indicia 24 is identical, i.e., certain information is provided with the exact same combination of letters/numbers, in the exact same vertical and lateral starting location, in the exact same character type, having the exact same character size and spacing. In this example the identical embossed indicia 24 includes the issue date, the expiration date and the text "YOUR NAME HERE." In various embodiments, however, certain of the embossed indicia 20 is different on different card portions. In the example shown in FIG. 1, the embossed data that is different includes the account number 20A and 20B on the cards 12. Specifically, in a preferred embodiment the sheet 10 contains two different types of card portions 12, a first type or group of card portions 12A having first embossed indicia 20A, also referred to as the A-series of cards 12, and a second type or group of card portions 12B having second embossed indicia 20B, also referred to as the B-series of cards. In this embodiment the A-series of cards 12A and the B-series of cards 12B alternate columns (16A and 16B, respectively) on the sheet 10. In a preferred embodiment, at least a portion of the first embossed indicia 12A and a corresponding portion of the second embossed indicia 12B contain the same information, but through different embossed data. Specifically, on the A-series of cards 12A in FIG. 1 the account number has a first text characteristic and is provided in a first character type, and on the B-series of cards 12B in FIG. 1 the account number has a different text characteristic and is provided in a second character type, which is different from the first character type. Accordingly, while the information or actual numbers of the account number in both the A-series of cards 12A and B-series of cards 12B are the same, and while the starting location for the account numbers in both the A-series of cards and B-series of cards are the same (i.e., there is no offset of the embossing of the account numbers), the embossed data is different on the A-series and B-series account numbers because a different text characteristic is utilized. Utilizing a different text characteristic allows an A-series card and a B-series card to be placed adjacent one another without the adjacent cards nesting. The A-series and B-series of cards cannot nest because the cards contain different information (i.e., the text characteristic of the account numbers is different), precluding nesting.

Referring again to FIG. 1, the card number data of the first embossed indicia 20A is printed and embossed in a different font or character type than the card number data of the second embossed indicia 20B. In the embodiment shown in FIG. 2, the card number data of the first embossed indicia 20A is printed and embossed in a larger text or character size (16 pt.) than the card number data of the second embossed indicia 20B (14 pt.). In other embodiments, the differing text characteristic may be text scale (i.e., extending or retracting only a single dimension of the text), text spacing (i.e., the space between the letters of text), or any other text characteristic. The differing text characteristics of the first embossed indicia 20A and the second embossed indicia 20B prevents the cards 12 from nesting when stacked in alternating fashion, as described below and shown in FIG. 3.

Further, other data, including individualized data, may also be provided on the cards 12. For example, rather than "YOUR NAME HERE," each card portion 12 may be individually printed with a specified person's name with all other data the same. In another example, all the data on each card portion 12 may be individualized.

As shown in FIGS. 1 and 2, the first card portions 12A and the second card portions 12B are arranged into alternating columns 16A,16B. In other words, the first columns 16A contain only first card portions 12A, and the adjacent second columns 16B contain only second card portions 16B. Consequently, each row 14 contains alternating first card portions 12A and second card portions 12B. This configuration allows the cards 12 produced from the sheet 10 to be easily arranged into alternating stacks by machine, as described below. In another embodiment, the first card portions 12A and the second card portions 12B may be arranged into alternating rows 14, rather than alternating columns 16. In other embodiments, the card portions 12 may be differently arranged. It is understood that the terms "rows" and "columns" are used herein for reference purposes only to achieve a desired result.

As shown in both FIG. 1 and FIG. 2, the card portions 12 also contain additional embossed indicia 24 that has identical data and information on the first card portions 12A and the second card portions 12B, including the effective date information and name information. In other words, the additional indicia 24 is provided with the same combination of letters/numbers, in the same lateral and vertical starting location, in the same character type, and having the same character size on each card portion 12. Also, the additional indicia 24 preferably has at least one text characteristic the same as either the first embossed indicia 20A or the second embossed indicia 20B. In the embodiment shown in FIG. 1, the additional indicia 24 have the same text font as the first embossed indicia 20A, and in the embodiment shown in FIG. 2, the additional indicia 24 have the same text font as both the first and second embossed indicia 20A, 20B.

In other embodiments, at least some of the first embossed indicia 20A and the second embossed indicia 20B may have other differing text characteristics, or may have more than one differing text characteristic. Additionally, all of the embossed indicia 20 on the first card portions 12A and second card portions 12B may have different text characteristics, and no additional identical embossed indicia 24 may be present. Further, the first card portions 12A and second card portions 12B may contain more than one differing text characteristic. Still further, a third or fourth card portion 12 may be created, having at least one text characteristic different from any of the other card portions 12.

Each card 12 or card portion 12 may also contain printed indicia (not shown) thereon, which is printed in ink or by some other means on each card. The printed indicia may include graphics and other artistic images to give the card 12 a desirable appearance. In the case of an imitation credit card, the printed indicia may include a logo of the bank offering the credit card. In a preferred embodiment, the printed indicia are identical on all the card portions 12. However, the sheet 10 may be printed to include individualized printed indicia on the cards 12 as well.

Figure 4:
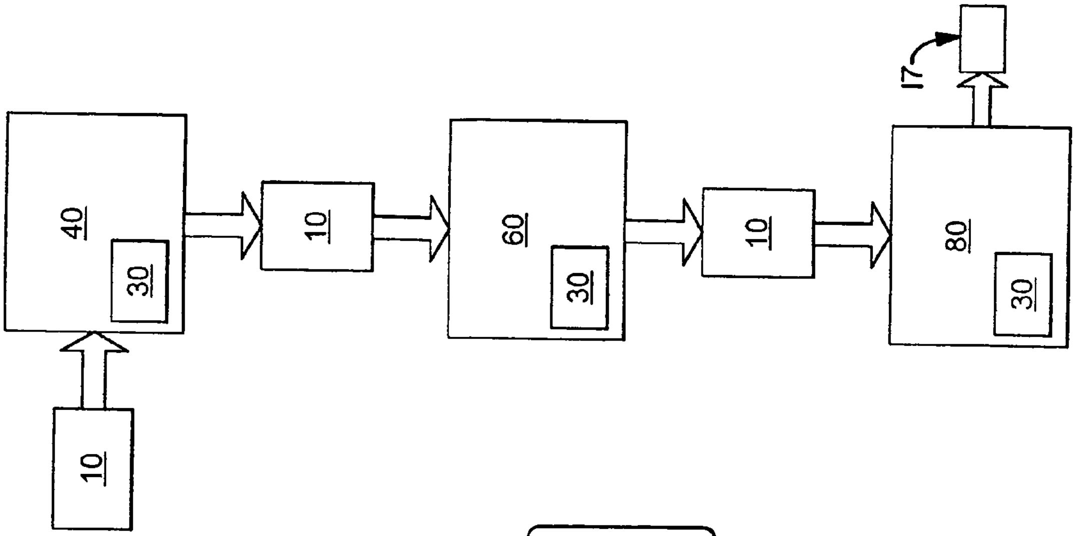
FIG. 4 is a schematic view of one embodiment of a batch embossing process of the present invention; and, FIG. 5 is a schematic view of one embodiment of a die cutting machine of the batch embossing process of FIG. 4.

FIG. 3 illustrates a plurality of cards 12 cut from the sheet 10 shown in FIG. 1, and arranged in an alternating, partially-stacked arrangement 15. It is understood that when the cards 12 in the partial stack 15 are moved together to align the edges of each card 12, a full stack 17 will be formed, as illustrated in FIG. 4, comprising alternating A-series 12A and B-series 12B cards 12.

The sheets 10 shown in FIGS. 1 and 2 have a plurality of registering marks 18, which are used for registering the sheet 10 during processing. As described below, the foil stamping machine 40, the embossing machine 60, and the die cutting machine 80 all have sensors 30 to detect the registration marks 18. A computer in each machine acknowledges the position of the sheet 10 by detecting the registration marks 18, allowing each machine to adjust and control the position of the sheet 10 for optimum processing. In one preferred embodiment, the sensors 30 are electronic or optical sensors, and the registration marks 18 are black marks positioned at different locations on the sheet 10. The sheets 10 may be provided with registration marks 18 already applied, or the registering marks 18 may be printed on the sheets.

The present invention also provides a method for batch or gang embossing a plurality of non-nesting cards 12 as described above. A schematic view of the batch embossing process is shown in FIG. 4, and utilizes a foil stamping machine 40, an embossing machine 60, and a die cutting machine 80. In an alternate embodiment, the process utilizes a printing machine (not shown) for printing indicia on each card 12, which is typically accomplished prior to the foil stamping. The method uses a plurality of sheets 10 of material, preferably a printed and coated PVC substrate as described above.

Generally, the method includes embossing a first card 12A with first embossed indicia 20A and embossing a second card 12B with second embossed indicia 20B. The second embossed indicia 20B provide the same information as the first embossed indicia 20A, however the data is different. Specifically, in one embodiment the second embossed indicia 20B have a text characteristic that is different from the text characteristic of the first embossed indicia 20A. In a preferred embodiment, described below, the first card 12A and the second card 12B are provided on a single sheet 10 of material having a plurality of first and second cards 12A,12B thereon, as shown in FIGS. 1 and 2. However, in an alternate embodiment, the cards 12 can be individually processed and embossed, rather than being processed as part of a sheet 10.

A preferred process begins with obtaining a sheet 10 containing a plurality of printed card portions 12 thereon. The printed sheet 10 is delivered to the foil stamping machine 40 to have indicia foil stamped on each card portion 12 on the sheet 10, preferably corresponding to the indicia to be embossed on each card portion 12. Accordingly, the text characteristics of the embossed indicia 20 of the finished card product 12 described above are preferably also reflected in the foil stamped indicia 20. Next, the embossing machine 60 embosses indicia 20 on the sheet 10, preferably corresponding to the foil stamped indicia 20, to define a plurality of first card portions 12A and a plurality of second card portions 12B. Each card portion 12 has substantially identical data contained in the indicia 20 thereon, as described above. A portion of the indicia 20A embossed on the first card portions 12A has a text characteristic different from a portion of the indicia 20B embossed on the second card portions 12B. After embossing, the die cutter 80 cuts the card portions 12 from the sheet 10 to form a plurality of cards 12, and the skeleton 11 of the sheet 10 is discarded. The cards 12 are provided in an arrangement alternating between cards formed from the first card portions 12A and cards formed from the second card portions 12B.

The foil stamping machine 40 applies a thin coating of metal foil in precision areas of the sheet 10. Specifically, the foil stamping machine 40 can apply a foil coating on the areas where the embossed indicia 20 on the sheet 10 will reside, which further highlights and contrasts the embossed indicia 20 from the remainder of each card 12. Such precision stamping requires accurate registration, and the foil stamping machine 40 preferably includes at least one sensor 30 to detect the registration marks 18 on the sheet 10 for registering purposes. The foil stamping machine 40 may stamp the entire sheet 10 at once, or may alternately foil stamp portions of the sheet in sequence and may also contain separate presses for stamping first card portions 12A and second card portions 12B separately. One preferred embodiment of the method utilizes a Q Master Platen MK1050 machine for foil stamping, but other commercially available foil stamping machines may be used with the present invention. In operation, the sheet 10 is placed in the foil stamping machine 40, and the foil stamping press therein is typically heated to 150-300° F. prior to stamping. The foil stamping machine 40 then applies the foil to the sheet 10 in the appropriate locations, i.e., the outline of the indicia 20 to be embossed.

The embossing machine 60 contains male and female dies (not shown) for embossing the sheet 10. Each die has an imprint of the indicia 20 to be embossed, corresponding to the indicia 20 already foil stamped on the sheet 10. Preferably, the dies are sized and adapted to emboss an entire sheet 10 with a single stamp of the dies. Alternately, the embossing machine 60 may emboss portions of the sheet 10 sequentially. Also, in a preferred embodiment, the dies are preferably designed to emboss indicia 20 on the sheet 10 to create the different card portions 12A,12B in alternating rows 14 and columns 16, as described above. The embossing machine 60 embosses both the first indicia 20A on the first card portions 12A and the second indicia 20B, having at least one different text characteristic from the first embossed indicia 20A, on the second card portions 12B. As described above, the first and second embossed indicia 20A,20B are preferably embossed in exactly the same positions on the card portions 12 and contain the same information, but at least a portion of the embossed indicia 20A,20B contains different data preferably through different text characteristics. As also described above, the embossing machine 60 may also emboss additional indicia 24, which are preferably identical in characteristic, position, and data on all of the card portions 12. In operation, the printed and foil-stamped sheet 10 is inserted into the embossing machine 60, and the dies stamp together to emboss the foil indicia 20. Like the foil stamping machine 40, the embossing machine 60 preferably includes at least one sensor 30 to detect the registration marks 18 on the sheet 10 for registering purposes. One preferred embodiment of the method utilizes a Q Master Platen MK1050 machine for embossing, but other commercially available embossing machines may be used with the present invention.

Figure 5:
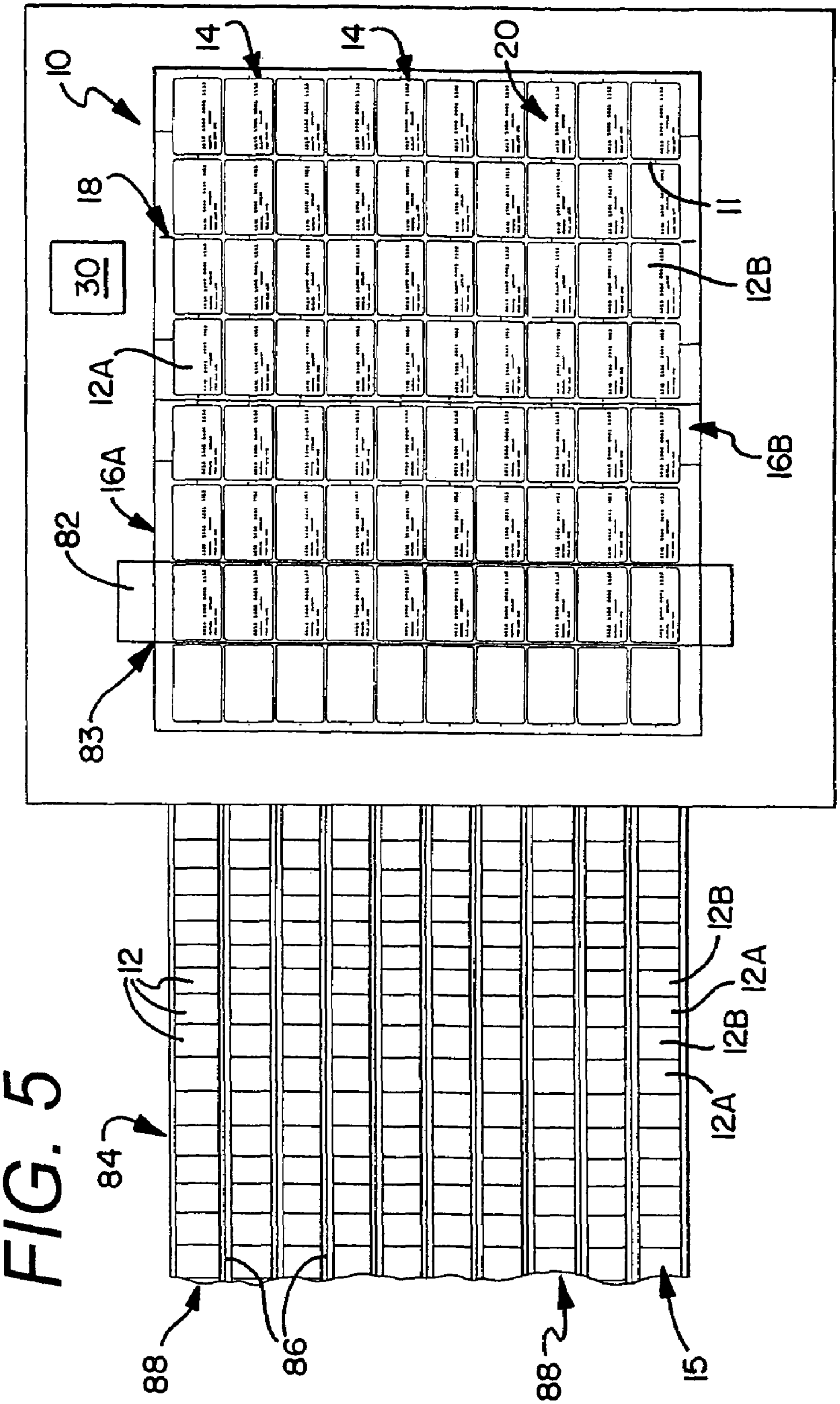

The die cutting machine 80 contains a cutting die 82 for cutting the sheet 10 to separate the card portions 12 from the sheet, forming cards 12, and is illustrated in greater detail in FIG. 5. The die cutting machine 80 also has a cutting area 83 for cutting and a conveyor 84 located below the cutting area 83 for transporting the cards 12 away from the machine 80 for stacking. Several dividers 86 form a plurality of channels 88 to the conveyor 84 and along the length of the conveyor 84. In a preferred embodiment, the cutting die 82 is specialized to simultaneously cut each card portion 12 from a single column 16 of the sheet 10 with a single stamp of the die 82. Additionally, the die cutting machine 80 preferably includes at least one sensor 30 to detect the registration marks 18 on the sheet 10 for registering purposes. Further, the die cutting machine 80 includes a loader (not shown) for individually and automatically loading sheets 10 into the machine 80.

In operation, the sheet 10 is loaded into the die cutting machine 80 and fed toward the cutting die 82, preferably by an automated feeding machine (not shown). By reading the registration marks 18, the die cutting machine 80 indexes the sheet 10 into the cutting position to cut a single column 16A of cards from the sheet 10. When the sheet 10 is properly positioned, the die 82 stamps the sheet 10, cutting away all ten card portions 12 in the column 16A, and the cut cards 12A fall through the channels 88 to the conveyor 84 below the die 82. The sheet 10 is then indexed further to place the next column 16B in position for cutting. The die 82 then stamps the sheet 10 again, cutting the second column 16B of card portions 12B from the sheet 10, and the cards 12B also fall through the channels 88 to the conveyor 84 below. The conveyor 84 moves slowly at a generally constant velocity relative to the feeder and the die 82, so that when the cards 12B from the second column 16B fall to the conveyor 84, they partially cover the cards 12A from the first column 16A. Thus, the cutting process produces a plurality of partially overlapped cards 12 cut from the same row 14 of the sheet 10 and dropped into the same conveyor lane. Because the preferred sheet 10 has alternating columns 16 of first card portions 12A and second card portions 12B, the cards 12 in each conveyor lane also alternate between first card portions 12A and second card portions 12B. An example of an alternating supply or partial stack 15 of cards 12 cut from the sheet 10 of FIG. 1 is illustrated in FIG. 3. After the card portions 12 are cut away, the skeleton 11 of the sheet 10 remains and is automatically disposed of by the machine 80. Each partial stack 15 can be easily formed into an alternating full stack 17, with the edges of the card 12 aligned, simply by pushing the ends of the partial stack 15 together.

In other embodiments, two or more of the foil stamping machine 40, the embossing machine 60, and the die cutting machine 80 may be integrated into a single machine. For example, in one embodiment, the method uses a Q Master Platen MK1050 machine that contains a foil stamping press, male and female embossing dies, and a punch. Also, in one embodiment, the cards 12 may be cut or otherwise formed prior to embossing and/or foil stamping. In this embodiment, the cards 12 are individually embossed and/or foil stamped by an embossing machine and/or foil stamping machine adapted for individual processing.

The product and method described above provide many benefits and advantages over prior art products and methods. Embossing typically leaves raised portions on one surface of a product and indentations on the opposing surface. When two identical card products are stacked together, the raised portions of the embossing on one card can nest within the indentations on the other card if the embossed data is identical. This nesting is undesirable, because it can cause cards in a stack to stick together and otherwise fail to separate easily. However, due to the first and second embossed indicia 20A, 20B having a different text characteristic, a card 12A having first indicia 20A will not nest with a card 12B having second indicia 20B, because the raised portions of one card 12A do not fit into the indentations of the other card 12B. Thus, if the cards 12A,12B are stacked in an alternating arrangement the cards will be easily separable. Additionally, the product and method provide a fast, efficient, and effective means of producing a large number of cards 12. Further, the die cutting machine 80 provides increased production efficiency by quickly cutting cards 12 from the sheets 10 and placing the cards 12 in position to be quickly easily formed into stacks. Still further advantages are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," "fourth," "row," and "column," as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. An embossed sheet product comprising:

a sheet of substrate material having a plurality of card portions defined thereon, each card portion having indicia embossed thereon, wherein a first group of the plurality of card portions has first embossed indicia providing information, and a second group of the plurality of card portions has second embossed indicia providing the same information, the second embossed indicia having a text characteristic that is different from a text characteristic of the first embossed indicia, and wherein the card portions have additional indicia embossed thereon having the same text characteristic as the embossed indicia of one of the first embossed indicia and the second embossed indicia.

2. The sheet material product of claim 1, wherein the text characteristic is text font.

3. The sheet material product of claim 1, wherein the text characteristic is text size.

4. The sheet material product of claim 1, wherein the card portions are arranged into rows and columns on the substrate material, the first group of card portions forming a first column and the second group of card portions forming a second column adjacent to the first column.

5. The sheet material product of claim 1, wherein the card portions are arranged into rows and columns on the substrate material, the first group of card portions and the second group of card portions forming one of alternating rows and columns.

6. The sheet material product of claim 1, wherein the card portions have printed indicia printed thereon.

7. The sheet material product of claim 1, wherein the first embossed indicia and the second embossed indicia are embossed in the same location on each respective card portion.

8. A method of making non-nesting embossed card products having the same data, comprising the steps of:

embossing a first card with first embossed indicia;

embossing a second card with second embossed indicia, the second embossed indicia providing the same information as the first embossed indicia, and the second embossed indicia having a text characteristic that is different from the text characteristic of the first embossed indicia, the method further comprising the step of embossing the first card and the second card to add additional indicia thereto, the additional indicia having the same text characteristic as the embossed indicia of one of the first card and the second card.

9. The method of claim 8, wherein the text characteristic is text font.

10. The method of claim 8, wherein the text characteristic is text size.

11. The method of claim 8, wherein the first embossed indicia are embossed in the same location on the first card as the location of the second embossed indicia on the second card.

12. The method of clam 8, further comprising the step of providing a single sheet of material having a plurality of first and second cards thereon.

13. A method of making embossed card products comprising the steps of:

embossing indicia on a sheet of material to define a plurality of first card portions and a plurality of second card portions, each card portion having substantially identical information thereon, wherein a portion of the embossed indicia on the first card portions have a text characteristic different from a portion of the embossed indicia on the second card portions;

cutting the card portions from the sheet to form a plurality of cards;

providing the cards in an arrangement alternating between cards formed from the first card portions and cards formed from the second card portions; and further comprising the step of embossing the first and second card portions to add additional indicia thereto, the additional indicia having the text characteristic the same as the embossed indicia of one of the embossed indicia of the first card portions and the embossed indicia of the second card portions.

14. The method of claim 13, wherein the text characteristic is text font.

15. The method of claim 13, wherein the text characteristic is text size.

16. The method of claim 13, wherein the first and second card portions are arranged into rows and columns on the sheet, the first card portions and the second card portions forming one of alternating rows and columns.

17. The method of claim 13, wherein the embossed indicia are embossed in the same location on the first card portions as the location of the embossed indicia on the second card portions.

* * * * *